Dec. 25, 1951     C. D. BURNEY     2,579,787
EQUIPMENT OF TRAWLING VESSELS
Filed Sept. 8, 1948
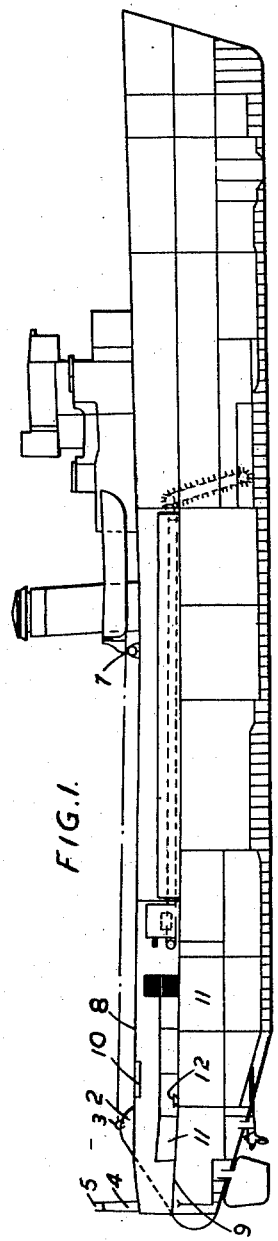
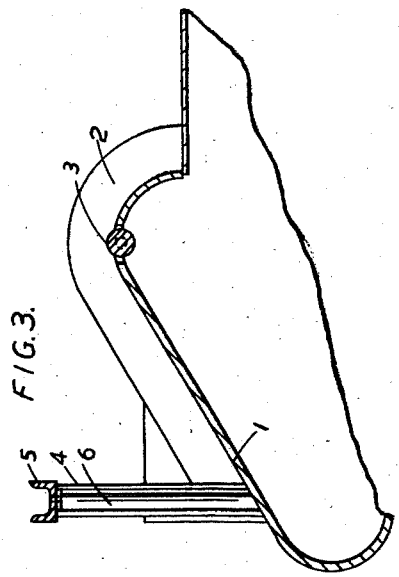
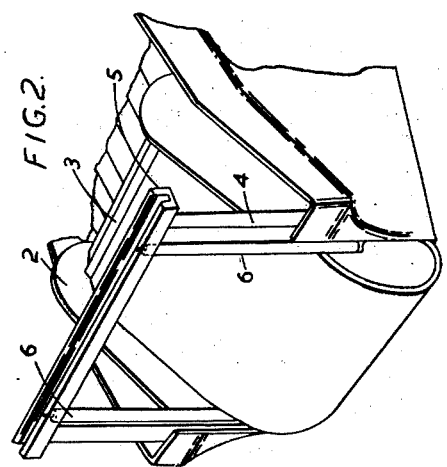
Inventor
Charles D. Burney
By
Attorney Patented Dec. 25, 1951

2,579,787

UNITED STATES PATENT OFFICE 2,579,787

EQUIPMENT OF TRAWLING VESSELS

Charles Dennistoun Burney, London, England, assignor to Fresh Frozen Foods Ltd., London, England Application September 8, 1948, Serial No. 48,253
In Great Britain September 18, 1947

2 Claims. (Cl. 114—0.5)

The present invention relates to the equipment on fishing vessels, and has for its object to provide an improved construction and arrangement of equipment, which will contribute largely towards economical handling and operation.

According to the invention, the stern of the ship has a rearwardly directed sloping chute fitted in a cut away portion of the ship's stern, with a transverse roller projecting above the surface of the chute, mounted at its highest point. Preferably the stern of the ship is equipped with a trawling deck above the main deck of the ship, on to which the trawling net is hauled over the stern of the ship, the fish on removal from the net being passed to the main deck through a hatch or hatches in the trawling deck. The fish is preferably cleaned on the main deck close to a freezing plant abaft the engine room, whereafter it is conveyed to the fish storage holds.

According to a further feature of the invention the vessel also has, adjacent to the sides of the stern chute substantially vertical rollers over which the towing cable passes when the net is hauled in from a position not directly in line with the stern of the ship.

In order that the invention may be clearly understood and readily carried into practice, it is illustrated by the accompanying drawings, in which—

Figure 1 is a diagrammatic longitudinal section of a trawling vessel embodying the invention.

Figure 2 is a perspective view of the stern of the ship, with part broken away, and Figure 3 is a sectional diagram through the chute in the longitudinal direction of the ship.

In a trawling vessel of normal construction the trawl net is shot and hauled in from the side of the ship, gallows fittings being provided for hauling up the otter boards when the net is hauled in.

According to the present invention the net is shot from and hauled in at the stern of the ship, with or without the otters, which may be hauled in, if desired, at each side of the stern. To facilitate the hauling in of the net, the stern of the ship is fitted with a sloping chute 1, fitted with side guide plates 2, to retain the net on the chute. To facilitate passage of the towing wires and net over the top of the chute 1, this is slotted at its highest point to accommodate a sunken transverse roller 3 which projects slightly above the top of the chute. In addition, to facilitate the hauling in of a net from positions lying to one side of the stern of the chute, substantially vertical posts 4 may be provided at the stern of the vessel, adjacent to the sides of the chute, which are spanned at their upper ends by a cross beam 5, and this structure supports two rollers 6 in an upright position at the sides of the chute at its lower end, over which the towing cable passes when leaving the stern of the ship at an angle.

The trawl net is attached to a cable which can be wound in by a winch 7, and the net is thereby drawn on to a special trawling deck 8 provided above the level of the main deck 9. The trawling deck 8 is completely flat and unobstructed and is used solely for the purpose of supporting the net when hauled in for emptying. In the trawling deck 8 is a hatch 10 through which the fish cleared from the net are transferred to the main deck 9 into fish ponds 11, from which they are extracted for preparation to enter the freezing chamber. The offal extracted in the process of gutting is passed into the hold 12 to serve as fish meal, for use as a fertilizer, or for other commercial purposes.

I claim:

1. A trawler comprising a vessel including a hull having a main deck extending substantially to the stern of the vessel, said main deck being provided at its stern with means for storing fish, a trawling deck mounted above the stern portion of the main deck to receive a trawling net, an inclined chute on the stern of the vessel and extending from a point above said trawling deck to a point below the main deck and beyond the stern of the hull, hauling gear on said trawling deck forward of said chute for hauling a trawling net up said chute onto said trawling deck, and a hatch in said trawling deck immediately in front of said chute and over said fish storing means for receiving and discharging fish from the net as it is hauled up onto said trawling deck.

2. A trawler as defined in claim 1 comprising a roller journalled transversely in the top of said chute to facilitate the hauling of a net onto said trawling deck, and vertically disposed rollers journalled on each side of the lower end portion of said chute and at the stern of the hull to facilitate hauling a net from positions laterally of the vessel.

CHARLES DENNISTOUN BURNEY.

REFERENCES CITED

The following references are of record in the file of this patent:

UNITED STATES PATENTS

| Number | Name | Date |
|---|---|---|
| 977,277 | Dalgleish | Nov. 29, 1910 |
| 1,863,989 | Liisanantti | June 21, 1932 |
| 2,377,693 | Johnson | June 9, 1945 |

FOREIGN PATENTS

| Number | Country | Date |
|---|---|---|
| 240,083 | Great Britain | Sept. 24, 1925 |